UNITED STATES PATENT OFFICE.

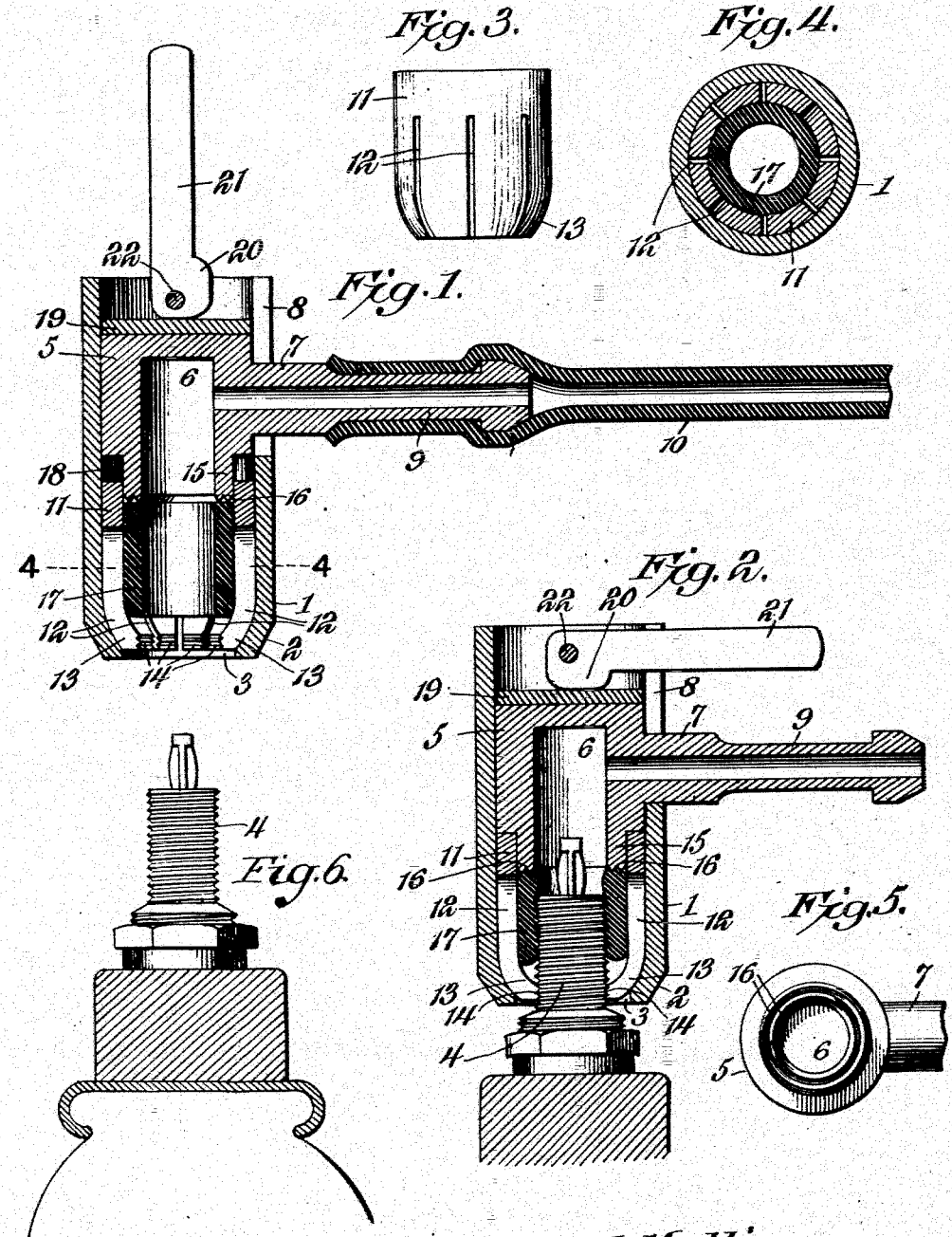

JOSEPH B. McMULLIN, OF OSKALOOSA, IOWA, ASSIGNOR TO WESTERN MANUFACTURING CO., OF OSKALOOSA, IOWA, A CORPORATION OF IOWA.

TIRE-PUMP CONNECTION.

1,340,785.  Specification of Letters Patent.  Patented May 18, 1920.

Application filed July 11, 1919. Serial No. 310,144.

*To all whom it may concern:*

Be it known that I, JOSEPH B. McMULLIN, a citizen of the United States, residing at Oskaloosa, in the county of Mahaska and State of Iowa, have invented a new and useful Tire-Pump Connection, of which the following is a specification.

This invention has reference to tire pump connections, and its object is to provide a readily attachable and detachable means for coupling an air pump or supply of compressed air to the inner tube nipple of a pneumatic tire.

Ordinarily tire pumps are provided with hose terminals arranged to screw on the inner tube nipple or to be pressed thereon, and in the latter case depending upon the resiliency of a rubber sleeve or washer to produce an air-tight connection.

In accordance with this invention, a rubber sleeve insures air-tight connections but manipulating means are provided whereby the rubber sleeve may be made to encircle the inner tube nipple so loosely that the application and removal of the connection does not wear the rubber sleeve or gasket, since it is only after the connection is in place that the rubber is moved into air-tight relation to the nipple and this air-tight condition is destroyed before the connection is withdrawn from the nipple.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a longitudinal section through the connection, with the latter in close spaced relation to an inner tube nipple.

Fig. 2 is a similar view but with the connection applied to the nipple.

Fig. 3 is an elevation of a split thimble forming part of the connection.

Fig. 4 is a section on the line 4—4 of Fig. 1.

Fig. 5 is a bottom plan view of a follower forming part of the connection.

Fig. 6 is a fragmentary elevation partly in section of the conventional tire and tire valve to which my connection is adapted to be coupled.

Referring to the drawing, there is shown a shell 1 which may be considered as of cylindrical form throughout the greater portion of its length, having one end 2 contracted and provided with an opening 3 of a size to freely receive the usual threaded nipple 4 of the inner tube of a pneumatic tire. Within the shell 1 there is located a follower 5 which may also be of cylindrical outline and provided with an axial bore 6 extending for the greater portion of the distance through the length of the follower. Branched off from the follower is an elbow 7 extending through a longitudinal slot 8 in one side of the shell 1 and terminating in a stem 9 outside of the shell, which stem is suitably shaped to receive and retain one end of an air hose 10. The air hose may be connected at the other end to a hand pump, or foot pump, or to a supply of air under pressure, the invention being applicable to any suitable device whereby compressed air may be directed into the inner tube of a pneumatic tire or to any point of utilization. Within the shell 1 and located between the follower 5 and the contracted end 2 of the cylinder is a thimble 11 having longitudinal slits 12 for the greater portion of its length (see Fig. 3), and the thimble has one end 13 contracted in conformity with the contracted shape of the interior of the shell at the end 2 so that such end of the thimble is tapered and split. The interior of the tapered and split end is provided, for a short distance, with interior screw-threads 14 of the same pitch as the exterior threads of the larger portion of the inner tube nipple 4. Ordinarily the threaded portion of the split end of the thimble 11 is sufficiently expanded to move freely over the threads of the nipple 4 but when the thimble is moved into the contracted end 2 of the shell 1 a sufficient distance the split end of the thimble is correspondingly contracted to cause the threads 14 to enter and mesh with the exterior threads of the nipple 4 as shown in Fig. 2.

The follower 5 at the end toward the thimble 11 is formed with a neck 15 of a size to telescope into the adjacent end of the thimble 11 and the free end of the neck 15 has annular knife seats or ribs 16.

Within the thimble 11 there is lodged a sleeve 17 of rubber or other suitable material having an inner passageway of sufficient diameter to slip freely over the threads of the nipple 4. The rubber sleeve 17 is of suitable length to reach from the interior contracted end of the thimble 11 to the free end of the neck 15 normally sustaining the follower 5 in spaced relation to the adjacent end of the thimble 11, leaving a clearance space 18. Applied to the closed end of the follower 5 is a wear plate 19 engaged by a cam head 20 on one end of a lever 21 pivoted in the end of the shell 1 remote from the contracted end 2 by a pin 22.

Assuming that the hose 10 is connected up to some suitable source of air under pressure, whether an air pump or a reservoir of compressed air, the shell 1 is brought into a position similar to that shown in Fig. 1 and is then moved onto the inner tube nipple 4, thus bringing the rubber sleeve 17 onto the nipple 4 in embracing relation thereto. When this is accomplished the lever 21, which normally is located in substantially the longitudinal axis of the shell 1, is moved about the pivot pin 22 until the handle end of the lever enters the slot 8. The cam head 20 is thereby brought into pressing engagement with the wear plate 19 forcing it, together with the follower 5, toward the end 2 of the shell 1. The knife seats 16, which are normally in engagement with the adjacent end of the rubber sleeve 17, are thus forced into such end of the sleeve, pressing the sleeve along the interior of the thimble 11, causing it to move into the contracted end of the thimble and so into close pressing relation to the threads of the nipple 4. In the meantime, the clearance 18 is taken up and the follower 5 presses upon the thimble 11, forcing the latter lengthwise of the shell 1 and because of the contracted end 2 of the shell the contracted end 13 of the thimble is collapsed to an extent causing the threads 14 to mesh with the threads of the nipple 4, thus anchoring them thereto. This causes the firm attachment of the connection as a whole to the nipple 4 and at the same time the rubber sleeve 17 is pressed tightly around the nipple 4 and the knife seat end of the neck 15 enters to an extent into the corresponding end of the sleeve 17. If now air be forced through the hose 10 it will find its way into the bore 6 and through the latter into the air receiving end of the nipple 4, while no amount of pressure which can be applied through the hose 10 will cause detachment of the hose connection from the nipple 4. When sufficient air has been pumped into the inner tube it is only necessary to release the cam lever 21 to permit reverse movement of the follower 5 and the release of the nipple 4 from engagement with the threads 14, whereupon the entire connection is free to be removed from the hose nipple.

The whole structure is characterized by relatively few parts, extreme cheapness of construction and high efficiency in and simplicity of operation.

It is obvious that the invention is susceptible of wide application, therefore I do not wish to limit the use of the invention to tire pumps.

What is claimed is:—

1. A tire pump connection comprising a shell constituting the body portion thereof, a follower in the shell provided with means for the attachment of a hose thereto, a thimble in the shell in coactive relation to the follower and having a contractible end with interior screw-threads to engage the exterior screw-threads of an inner tube nipple, a yieldable gasket within the thimble for engaging the exterior threads of the inner tube nipple, and means for forcing the follower against the gasket to compress the latter and also to cause a movement of the thimble to contract the threaded portion thereof about the inner tube nipple into meshing relation with the threads thereof.

2. A tire pump connection comprising a shell, a longitudinally movable thimble therein having a split contracted end with interior screw-threads adapted to mesh with the exterior screw-threads of an inner tube nipple, a follower in the shell provided with a neck entering the end of the thimble remote from the screw-threads, said follower having a hose receiving elbow, an elastic sleeve in the thimble in the path of the neck on the follower and of a size to embrace the inner tube nipple, and clamp means at the end of the shell remote from the thimble for forcing the follower against the thimble and against the elastic sleeve to cause contraction of the thimble to engage the interior threads thereof with the exterior threads of the inner tube nipple and to compress the rubber sleeve into air-tight relation with the inner tube nipple and the neck of the follower.

3. A tire pump connection comprising a shell, a longitudinally movable thimble therein having a split contracted end with interior screw-threads adapted to mesh with the exterior screw-threads of an inner tube nipple, a follower in the shell provided with a neck entering the end of the thimble remote from the screw-threads, said follower having a hose receiving elbow, an elastic sleeve in the thimble in the path of the neck on the follower and of a size to embrace the inner tube nipple, and clamp means at the end of the shell remote from the thimble for forcing the follower against the thimble and against the elastic sleeve to cause contraction of the thimble to engage the interior threads thereof with the exterior threads of the inner tube nipple and to compress the rubber sleeve into air-tight relation with the inner tube nipple and the neck of the follower, said clamp means comprising a cam lever mounted in the end of the shell remote from the thimble and accessible from the exterior of the shell to actuate the follower.

4. A tire pump connection comprising an open-ended shell with the interior of one end contracted, a thimble lodged in the contracted end of the shell and also contracted and split longitudinally, said thimble at the contracted end being provided with interior screw threads corresponding to the exterior threads on an inner tube nipple, and means within the thimble and contracted by the split portions thereof for forming an air-tight connection with said nipple.

5. A tire pump connection comprising an open-ended shell with one end interiorly contracted, a thimble lodged in the shell and movable lengthwise thereof, said thimble being split lengthwise for a portion of its length with the split portion extending to one end and at said end the thimble being contracted and provided with interior screw-threads conforming to the screw-threads of an inner tube nipple, a follower within the shell provided with an axially extended neck entering the thimble with the extremity of the neck provided with knife seats, said follower also having an elbow extension projecting through one side of the shell and the latter having an elongated slot for the passage of the elbow, an elastic sleeve or gasket seated in the thimble in the path of the neck of the follower and extended toward the contracted end of the thimble, and a cam lever mounted in the shell at the open end thereof remote from the thimble and adapted to exert pressure on the follower to in turn compress the elastic sleeve or gasket and to move the thimble lengthwise of the shell toward the contracted end thereof whereby to contract the split end of the thimble into meshing engagement with the threads on the inner tube nipple.

6. In a device of the class described, a shell, a follower in the shell having an axial bore and having means for the attachment of a hose thereto, a thimble in the shell in coactive relation to the follower, a yieldable gasket within the thimble at one end of the follower, and means for forcing the follower and thimble against the gasket to compress the latter.

7. In a device of the class described, a shell having one end contracted, a follower in the shell having an axial bore with means for the attachment of a hose thereto, a thimble in the shell in telescoping relation to the follower and having a contractible end, a gasket in the form of a sleeve located within the thimble and at one end of the follower and in alinement with the bore of the latter, and means for forcing the follower against the gasket to compress the latter and to force the contractible end of the thimble against the contracted end of the shell.

8. In a device of the class described, a shell constituting the body thereof, a follower in the shell having an axial bore with means for the attachment of a hose thereto, a thimble in the shell in coactive relation to the follower and having a contractible end, a gasket within the thimble formed of a cylindrical sleeve located at one end of the follower, said sleeve having an inner passageway of sufficient diameter to slip freely over a tire nipple, and means for forcing the follower against the gasket to compress the latter about the nipple and also cause a movement of the thimble to contract the end thereof about the nipple.

9. A tire pump connection comprising an open-ended shell with one end contracted, a thimble in the shell lengthwise thereof and having portions contractible by the contraction of the shell, a follower within the shell provided with an axially extended neck entering the thimble, the extremity of the neck being provided with annular knife seats, an elastic sleeve or gasket seated in the thimble in the path of the neck of the follower and having one end thereof engageable by said knife seats, and means adapted to exert pressure upon the follower to contract both the thimble and sleeve to form an air-tight connection.

In testimony that I claim the foregoing as my own, I have hereto affixed my signature.

JOSEPH B. McMULLIN.

Witnesses:
 JOE C. WOODFORD,
 THELMA AIKEN.